(12) United States Patent
Richard

(10) Patent No.: US 7,345,980 B2
(45) Date of Patent: Mar. 18, 2008

(54) OPTICALLY STORING DIGITAL DATA IN THE FORM OF SPECTRALLY CODED PARTICLES

(75) Inventor: Nicolas Richard, Dijon (FR)

(73) Assignee: Thomson Licensing, Boulogne Billancourt (FR)

( * ) Notice: Subject to any disclaimer, the term of this patent is extended or adjusted under 35 U.S.C. 154(b) by 520 days.

(21) Appl. No.: 10/432,320

(22) PCT Filed: Nov. 15, 2001

(86) PCT No.: PCT/EP01/13228

§ 371 (c)(1),
(2), (4) Date: May 21, 2003

(87) PCT Pub. No.: WO02/43061

PCT Pub. Date: May 30, 2002

(65) Prior Publication Data

US 2004/0035940 A1    Feb. 26, 2004

(30) Foreign Application Priority Data

Nov. 24, 2000   (FR) .................... 00 15229

(51) Int. Cl.
*G11B 7/00* (2006.01)

(52) U.S. Cl. ............... 369/101; 369/288; 369/121

(58) Field of Classification Search .............. None
See application file for complete search history.

(56) References Cited

U.S. PATENT DOCUMENTS

2003/0064532 A1*  4/2003  Chen ..................... 438/3

FOREIGN PATENT DOCUMENTS

JP          4-62090         2/1992

OTHER PUBLICATIONS

Ditlbacher et al. Spectrally coded optical data storage by metal nanoparticles, Apr. 15, 2000, vol. 25, No. 8, Optics Letters.*
Patent Abstracts of Japan, vol. 016, No. 253, Jun. 9, 1992 & JP 4-62090.
H. Ditlbacher et al. "Spectrally Coded Optical Data Storage by Metal Nanoparticles" Optics Letters, Optical Society of America, Washington, US, vol. 25, No. 8, Apr. 15, 2000, pp. 563-565.
Search Report dated May 15, 2002.

* cited by examiner

*Primary Examiner*—Wayne Young
*Assistant Examiner*—Lixi Chow
(74) *Attorney, Agent, or Firm*—Joseph J. Laks; Harvey D. Fried; Richard LaPeruta

(57) ABSTRACT

A digital data storage medium comprises data in the form of particles which are spectrally coded. The particles generally have the same size and shape. The particles are spectrally coded by tailoring metal species to have specific absorption signature. The size, shape and metal species are selected to increase storage density.

6 Claims, 2 Drawing Sheets

OPTICALLY STORING DIGITAL DATA IN THE FORM OF SPECTRALLY CODED PARTICLES

Figure 1:
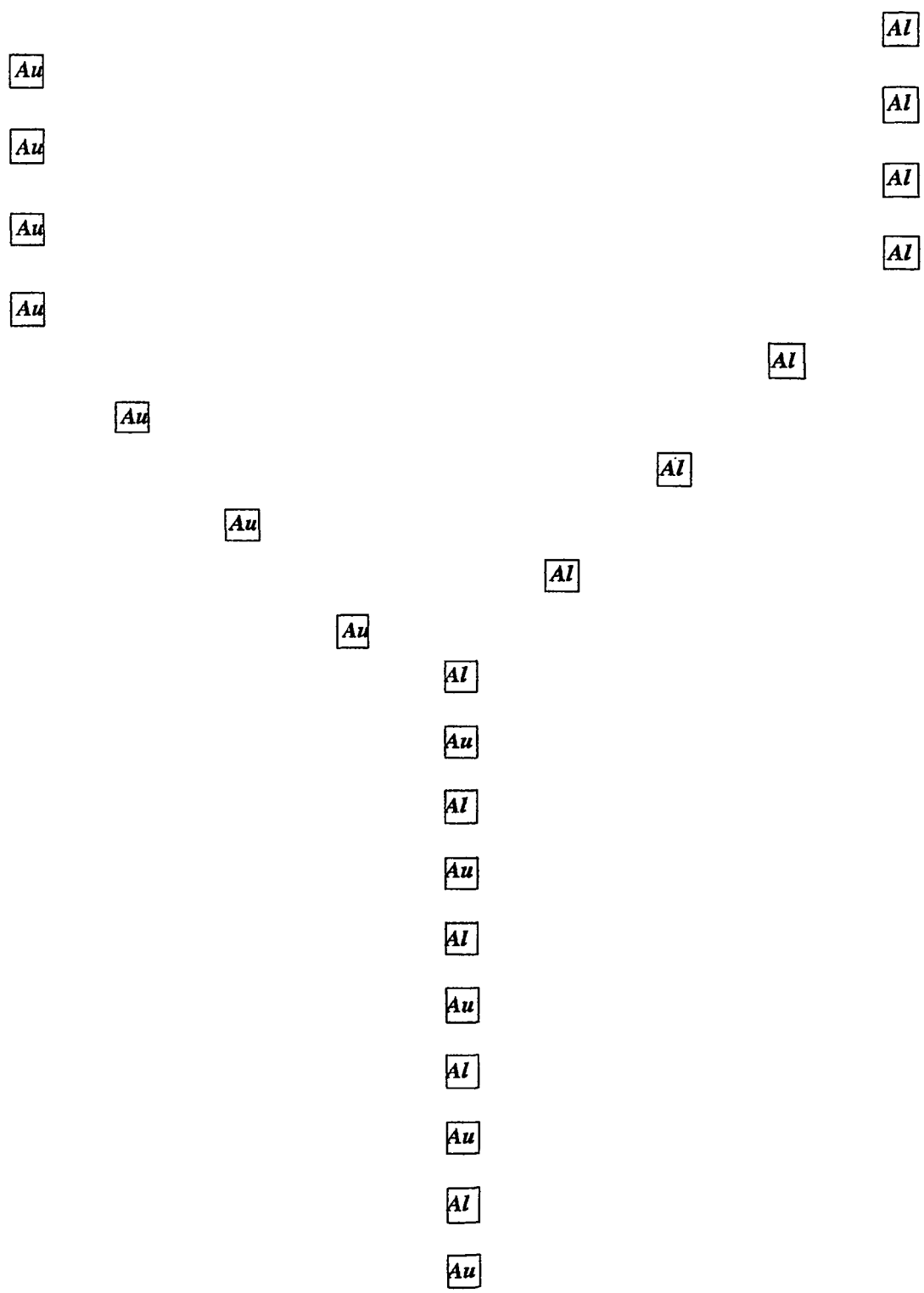

This application claims the benefit, under 35 U.S.C. § 365 of International Application PCT/EP01/13228, filed Nov. 15, 2001, which was published in accordance with PCT Article 21(2) on May 30, 2002 in English and which claims the benefit of French patent application No. 0015229, filed Nov. 24, 2000.

The invention relates to an optical storage medium for digital data.

Digital data are conventionally stored on optical storage media in binary mode in the form of information elements, as etched elements, called pits; generally, the presence of an element indicates the value 1 for the bit which is read, and the absence of an element results in the value 0 for this bit; these elements are generally distributed over at least one plane surface internal to the medium, called an information layer, as, for example, an etched layer; the medium may comprise several superimposed information layers.

In the case of a conventional optical disk, the information elements of the same layer are distributed in several concentric circular tracks.

The maximum storage density on an information layer is limited by the minimum size of the information elements and by the minimum distance between two adjacent elements of the same track or of neighboring tracks.

In practice, in order to be able to read the digital data stored by conventional optical detection means, this minimum size and this minimum distance correspond to the wavelength of the light used for the optical detection.

In practice, the minimum size of these elements is currently about 0.5 µm.

This minimum size therefore limits the storage density of an information layer.

Document JP 04-062090 (Ube) describes the use of nanoparticles in a layer for optically recording digital data in order to increase the reflection factor of this layer, while at the same time minimizing its thermal conduction.

The article entitled "Spectrally coded optical data storage by metal nanoparticles" published on 15 Apr. 2000 in the review Optics Letters, Vol. 25, No. 8, pages 563-565, written by H. Diltbacher et al., indicates that the use of non-linear optical technologies affords solutions to increase the storage density of these layers. Specifically the reference asserts that "In metal nanoparticles, collective oscillations of conduction electrons (electron plasma) can be resonantly driven by light (particle plasma). The resonant wavelength of particles plasmons is determined by several parameters: the dielectric function of the metal, the dielectric constant of the surrounding medium, and the particle shape. . . . This phenomenon of light-field-driven collective electron oscillation resonances in metal nanoparticles opens up a new method of optical data storage through spectral coding by particles with different resonant wavelengths. Multiwavelength optical memory systems are of great current interest owing to their potential for increased storage capacity. Metal nanoparticles (e.g., from silver or gold) as a storage medium are deposited on a transparent substrate. . . . As the resonant wavelength of a particle for a given polarization state is determined by the ratio of its axes, by using an appropriate shape design and particle orientation one can obtain spectrally coded data storage through plasmon resonances." For metal particles in the size range 30-150 nm, "scattered light emerging from that spot has a spectral composition determined by the different resonant wavelengths given by the different shapes and orientations of the particles contained in the spot. Thus the storage of additional information on the area occupied by a conventional optical storage element (CD pit) is possible by deposition of several individually shaped nanoparticles. This additional information is contained in the scattered light and can be read out by appropriate spectral analysis of the scattered light. . . . Therefore, by use of the proposed spectral coding of scattered light that is accessible by conventional optical far-field methods, the information content of a pit can be increased by at least a factor of 5." . . . Particles consisting of silver on indium tin-oxide-coated glass substrates are deposited "by use of an electron-beam lithographic method." . . . "The main advantage of the present application of metal nanoparticles as nano-optic storage elements is the possibility of readout by use of an established technique (modified CD readout). The development of a new near-field optical technique is not necessary. In principle, for mass production, a nanoimprinting procedure for fabricating spectrally coded ROM media is also suggested" in S. Y. Chou, P. R. Krauss, and P. J. Renstrom, J. Vac. Sci. Technol. B 14,4129 (1996).

The latter document indicates that, if the spectral composition of the light scattered by an information element can be made dependent on a parameter relating to the information element, such as the shape, the amount of information carried by an information element would then be increased, thereby increasing the optical storage density of digital data.

To this end, this document teaches arranging, on a medium or surface that can be used for storage, metal particles of sizes less than that of the wavelength of the light, and of different size and/or shape and/or orientation.

Thus, when this surface is suitably illuminated, resonant modes of groups of electrons, called "localized plasmons", are excited within these metal nanoparticles, which causes absorption of certain wavelengths of the incident radiation; since the excitation of these resonant modes depends on the shape, the orientation and the distribution of these nanoparticles, this leads to spectrally coded or "polychromatic" data storage; in this "polychromatic" method, the maximum storage density is noticeably increased by a factor of about 5 compared to the conventional "monochrome" optical storage modes.

More specifically, according to this document, silver nanoparticles are deposited on a transparent substrate using a cathodo-lithographic process; in order to optically read digital data stored in this coating, a localized electron plasma is excited within these nanoparticles by means of an evanescent electromagnetic field obtained by total internal reflection of radiation incident on the surface of the substrate; in order to calculate the amplitude of the "plasmon" resonance, the intensity of the light scattered by this surface is measured as a function of the wavelength using conventional optical detection means.

The methods which can be used for depositing nanoparticles suitable for polychromatic optical storage are expensive, especially when they involve depositing particles of different shapes.

The aim of the invention is to overcome this drawback.

To this end, the subject of the invention is means for optically storing digital data in the form of particles deposited on a surface, the dimensions of which are less than the wavelengths of radiation interacting with the said particles and coming from means for reading the said data, characterized in that they comprise a means of spectrally coding the said data using the chemical type of the said particles.

The term "spectral coding means" refers to any specific characteristic of the particles adapted to impart to this particle, when it is subject to excitation by incident radiation coming from the reading means, a response dependent on the wavelength of this radiation.

The invention may also have one or more of the following characteristics:

- the chemical types of the said particles used for the spectral coding are chosen from the group comprising gold, silver, aluminium, copper and mixed indium and tin oxide;
- the said particles deposited on the same surface have approximately the same dimensions.

The use of the particle dimensions as a spectral coding means, as in the prior art, is therefore precluded; by virtue of this additional characteristic, the particles of different types but of the same size may be deposited more economically using the same process with the same settings; thus, digital data is then spectrally coded using particles which are identical in size but different in type, and this makes it possible to produce the digital data pattern more economically.

The term "approximately identical dimensions" refers to the dimensions of particles achieved by using the same deposition process with the same settings.

Preferably, the dimensions of the said particles are less than or equal to 200 nm; typically, the dimensions of the particles are about 100 nm×100 nm×40 nm.

The size of the said particles is adapted in order to obtain electron plasma resonance therewithin at at least one wavelength of the radiation coming from the said reading means.

The wavelength for exciting the resonance generally corresponds to a fairly wide range of wavelengths centred on a peak where the resonance is maximum.

Preferably, the various resonant wavelengths for the particles of different type are between 350 nm and 1100 nm.

The subject of the invention is also a system for optically reading digital data stored on the storage means according to the invention, characterized in that it comprises means for exciting localized plasmon resonance within the said particles.

Figure 2:
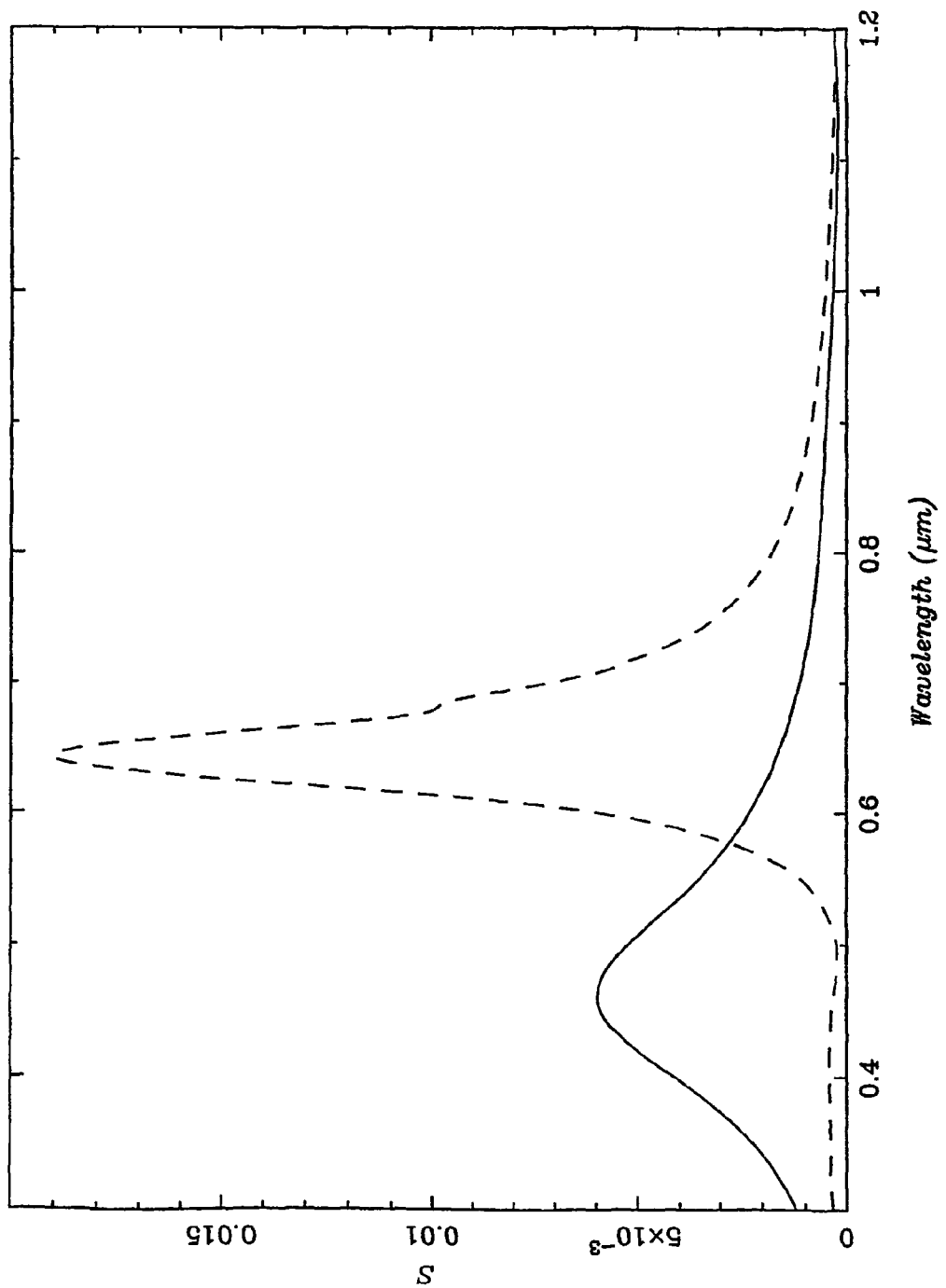

The invention will be better understood on reading the following description, given by way of non-limiting example, and with reference to the appended figures in which:

FIG. 1 illustrates the distribution according to the invention of particles of different or identical types along digital data storage tracks, FIG. 2 shows the intensity scattered by an aluminium particle (continuous line) and by a gold particle (discontinuous line) when they are excited by radiation of variable wavelength.

Using conventional cathodo-lithography methods, particles of identical dimensions but of different type are deposited on a glass substrate.

For example, it is chosen to alternately deposit particles made of gold and particles made of aluminium having the same dimensions 100 nm×100 nm×40 nm along a main straight track, then, along two branched tracks starting from one end of this main track, to deposit only gold particles on the first branched track and only aluminium particles on the second branched track.

The particles are deposited so that the distance separating two adjacent particles is greater than the lateral dimension of these particles, so as to prevent any effect of coupling between these particles which would be able to modify the resonant wavelength.

FIG. 1 illustrates the diagram for placing particles.

Using suitable computing means known per se, the intensity scattered by an aluminium particle and by a gold particle excited under conditions of total internal reflection at an angle of incidence of 60°, is calculated; the results were calculated at a distance of about 30 nm above the upper surface of the particles; the results obtained are normalized as a function of the incident light and are shown in FIG. 2 with a continuous line for the aluminium particles and a discontinuous line for the gold particles.

A lateral size of about 100 nm is chosen for the gold particles, since it leads, as illustrated in FIG. 2, to a maximum resonance of the localized plasmons within this particle of around 640 nm, which corresponds to the emission wavelength of the helium-neon laser.

The metal information element, constituting the gold particle, reacts like a dipole parallel to the deposition surface and scatters the light in a direction which is mainly perpendicular to the axis of this dipole; in addition, the angle of incidence of the excitation radiation does not change the resonant wavelength of the localized plasmon in the particle.

Again according to FIG. 2, it will be noticed that the maximum "plasmon" resonant wavelength of the aluminium information elements is situated between about 400 nm and 500 nm.

The use of the surface endowed with these information elements as a means for storing digital data will now be illustrated:

- on illuminating this surface using radiation whose wavelength is about 640 nm under conditions of total internal reflection at an angle of incidence of 60°, only the presence of gold particles on the various tracks is detected, that is to say that one particle in two on the main track and only the particles of the first branched track are distinguished;
- on illuminating this surface using radiation whose wavelength is about 400 nm under conditions of total internal reflection at an angle of incidence of 60°, only the presence of aluminium particles on the various tracks will be detected, that is to say that one particle in two on the main track and only the particles of the second branched track are distinguished.

Each point of the tracks of the surface therefore carries the following information which can be used for digital data coding:

absence or presence of an element, where an element is present, a scattering maximum at 640 nm or around 400 nm, that is, three information levels for each point.

In this way, a ternary digital data storage mode is achieved.

The surface endowed with these information elements therefore forms a means of storing digital data; this means makes it possible to achieve a very high storage density, firstly since the particles are very small; although they have dimensions less than the wavelength of the light which is used to detect them, it is all the same possible to detect their presence or their absence by means of the localized plasmon resonance phenomenon therewithin.

The fact that the presence of a gold information element and that of an aluminium information element cannot be detected at the same wavelength leads to the possibility, according to the invention, of spectrally coding digital data; the means for storing digital data obtained thus make it possible to store data in ternary mode, and this makes it possible to further increase the storage density compared to conventional means of storage in binary mode.

According to a variant of the invention, more than two different types of particles are used, so as to further increase the number of information levels per point on the surface, and to further increase the storage density; the type of these particles will be chosen, in a way known per se, so that the maximum resonant wavelengths do not overlap.

The invention claimed is:

1. A digital optical storage medium comprising particles deposited on a surface, wherein dimensions and chemical compositions are selected such that the particles are spectrally coded, the particles have approximately the same dimensions and have different chemical compositions, and the dimensions are less than the wavelengths of radiation used by an optical data reading device intended to read data which is represented by the spectrally coded particles.

2. The optical storage medium according to claim 1, wherein the chemical compositions of the spectrally coded particles are chosen from the group consisting gold, silver, aluminum, copper, and mixed indium and tin oxide.

3. The optical storage medium according to claim 1, wherein the dimensions of the particles are less than or equal to 200 nm.

4. The optical storage medium according to claim 1, wherein the size of the particles is adapted in order to obtain electron plasma resonance matching at least one wavelength of the radiation coming from the optical data reading device.

5. The optical storage medium according to claim 4, wherein resonant wavelengths for the particles of different types are between 350 nm and 1100 nm.

6. A system for optically reading digital data stored on the optical storage medium according to claim 1, wherein the system comprises a light source for exciting localized-plasmon resonance within the particles.

* * * * *